United States Patent [19]
Fechter

[11] Patent Number: 5,803,811
[45] Date of Patent: Sep. 8, 1998

[54] TORQUE OVERLOAD CLUTCH AND CLUTCH PLATE

[75] Inventor: Mark A. Fechter, West Bend, Wis.

[73] Assignee: Weasler Engineering, Inc., West-Bend, Wis.

[21] Appl. No.: 772,820

[22] Filed: Dec. 24, 1996

[51] Int. Cl.[6] ........................................ F16D 1/12
[52] U.S. Cl. .................. 464/46; 192/107 R; 464/17; 464/48
[58] Field of Search .................. 464/40, 45, 46, 464/48, 17, 30; 192/107 R, 70.17

[56] References Cited

U.S. PATENT DOCUMENTS

| | | | |
|---|---|---|---|
| 1,527,197 | 2/1925 | Klocke . | |
| 2,136,370 | 11/1938 | Bockius et al. | 154/2 |
| 2,168,136 | 11/1939 | Wellauer | 464/48 |
| 2,729,007 | 1/1956 | Holloway | 464/46 |
| 3,972,400 | 8/1976 | Howells | 192/107 R |
| 4,373,358 | 2/1983 | Pearch et al. | 464/48 |
| 4,385,429 | 5/1983 | Crankshaw | 29/434 |
| 4,429,770 | 2/1984 | Weisbrod | 188/73.32 |
| 4,445,876 | 5/1984 | Entrup | 464/48 |
| 4,548,302 | 10/1985 | Lech, Jr. et al. | 464/68 X |
| 4,564,994 | 1/1986 | Marx | 29/468 |
| 4,617,003 | 10/1986 | Bober et al. | 464/48 |
| 4,667,534 | 5/1987 | Kataoka | 192/107 R |
| 4,967,893 | 11/1990 | Vogele | 192/107 R |
| 5,052,536 | 10/1991 | Maeda | 192/107 M |
| 5,335,765 | 8/1994 | Takakura et al. | 192/107 R |
| 5,456,343 | 10/1995 | Murata et al. | 192/107 R X |
| 5,531,307 | 7/1996 | Fechter et al. | 192/56.4 |
| 5,566,802 | 10/1996 | Kirkwood | 192/107 R X |
| 5,605,210 | 2/1997 | Koike et al. | 192/107 R X |
| 5,681,222 | 10/1997 | Hansen et al. | 464/17 |

FOREIGN PATENT DOCUMENTS

| | | | |
|---|---|---|---|
| 48516 | 3/1982 | European Pat. Off. | 464/40 |
| 62-35119 | 2/1987 | Japan | 464/40 |
| 1128010 | 12/1984 | U.S.S.R. | 464/40 |
| 431026 | 6/1935 | United Kingdom | 464/48 |
| 2088527 | 6/1982 | United Kingdom | 464/30 |
| 2233735 | 1/1991 | United Kingdom | 464/46 |

*Primary Examiner*—Eileen A. Dunn
*Attorney, Agent, or Firm*—Quarles & Brady

[57] ABSTRACT

A dry plate torque overload clutch for a driveline has a clutch plate with knurled surfaces that are impressed into the facing surfaces of friction discs to strengthen and support the friction disc material so as to resist being squeezed out from between the clutch plate and the housing and pressure plate on the opposite sides of the friction discs.

8 Claims, 3 Drawing Sheets

TORQUE OVERLOAD CLUTCH AND CLUTCH PLATE

BACKGROUND OF THE INVENTION

1. Field of the Invention

This invention relates to torque transmitting couplings for drive-lines and in particular to a dry plate torque overload clutch for an agricultural or similar driveline.

2. Discussion of the Prior Art

In connecting a driveline between a driven shaft and a driving shaft, for example, in connecting the universal joint of an agricultural implement to the power take-off shaft of a tractor, a torque limiting friction clutch may be used in the coupling. Such clutches are typically dry plate clutches and have a constant relatively high axial force, which may be imparted by a spring, biasing the clutch plates together in frictional engagement, with relatively soft friction discs interleaved with relatively hard metal plates or a flat surface of the clutch housing. Such a clutch is disclosed in U.S. Pat. No. 5,681,222 issued Oct. 28,1997, the disclosure of which is hereby incorporated by reference.

In the clutch disclosed U.S. Pat. No. 5,681,222 (See also FIG. 2), the clutch plate 50 has opposite axial faces which are flat and are bonded to axial faces of friction discs 52 and 54. The friction discs 52 and 54 are made of a relatively soft friction lining material and are subjected to extreme heat and pressure when a torque overload occurs. The pressure, e.g., 5,000–12,000 lbf. in the axial direction, is constantly exerted by the spring 60 and the heat is generated by frictional rubbing between the outer axial faces of the friction discs 52 and 54 and the mating faces of the pressure plate 56 and housing 22 when a torque overload occurs.

In the clutch disclosed in U.S. Pat. No. 5,681,222, the axial faces of the clutch plate 50 were flat and bonded to the faces of the discs 52 and 54. It was found that under the extreme heat and pressures to which the discs 52 and 54 were subjected, the discs 52 and 54 tended to be squeezed radially outwardly from between the plate 50 and plate 56 on one side and between the plate 50 and housing 22 on the other side. The object of this invention is to provide a practical solution to this problem.

SUMMARY OF THE INVENTION

In accordance with this object, the invention provides a clutch plate for a dry friction clutch of the above described type, in which an axial face of the clutch plate defines a knurl pattern and features of the knurl pattern are impressed into the axially facing side of the friction disc. The penetration of the peaks of the knurl pattern into the side of the friction disc reinforces the friction disk and holds it rotatably and radially relative to the surface of the clutch plate so as to resist flow of the friction disc out from facing contact with the clutch plate. To maximize the reinforcement, the knurled surface of the clutch plate preferably penetrates the surface of the friction disc as far as possible, i.e., all the way to the bottoms of the valleys of the knurl, so that the friction disc material completely fills the valleys of the knurl.

In more detailed aspects, the knurl pattern is in a raised diamond pattern or a helicoidal pattern, the latter being preferred for reinforcing the friction disc.

The greatest advantages are achieved with the invention when a clutch plate has both sides knurled, with both in face to face contact with, and impressed into, the surfaces of two friction discs. This construction is most applicable to a torque overload clutch, in which a spring exerts an axial force that continuously compresses the friction discs against the axially facing sides of the clutch plate. In such a construction, the impression of the knurled surfaces of the clutch plate into the facing surfaces of the friction discs is sufficient to hold the friction discs in position, no other securement being necessary.

Other objects and advantages of the invention will be apparent from the drawings and the detailed description.

DETAILED DESCRIPTION OF THE PREFERRED EMBODIMENTS

Figure 1:
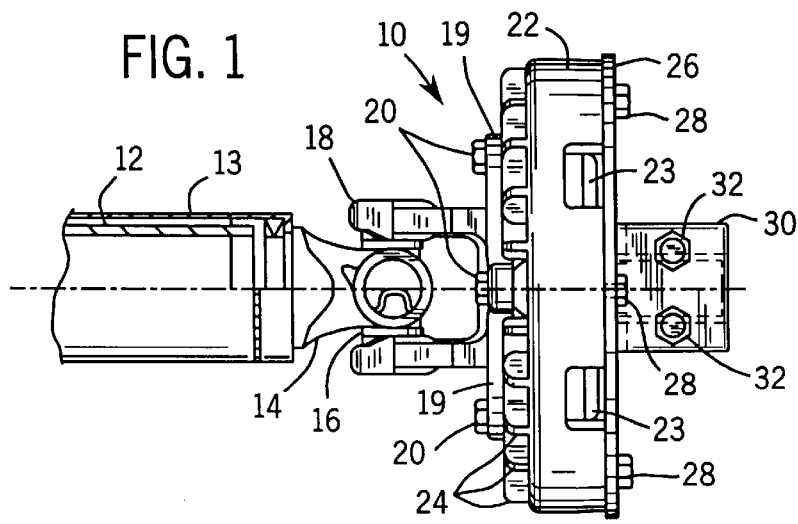
FIG. 1 is a plan view of a torque overload device incorporating the invention, shown attached to a driveline.

FIG. 1 illustrates a device 10 of the invention shown coupled to a driveline 12. The driveline 12 may be any type of driveline, for example an industrial or an agricultural driveline, and may be provided with a shield or guard 13.

At one end of the driveline, a universal joint yoke 14 is secured to the driveline and is rotatably secured to two arms of a universal joint cross 16, whose other two arms are rotatably secured to yoke 18, which is part of the device 10. Yoke 18 has legs 19 (three of four are shown) which are fixed by bolts 20 to a clutch housing 22 which has cooling fins 24 on its front side and is covered on its back side by cover plate 26, which is secured to the housing 22 by bolts 28.

Figure 2:
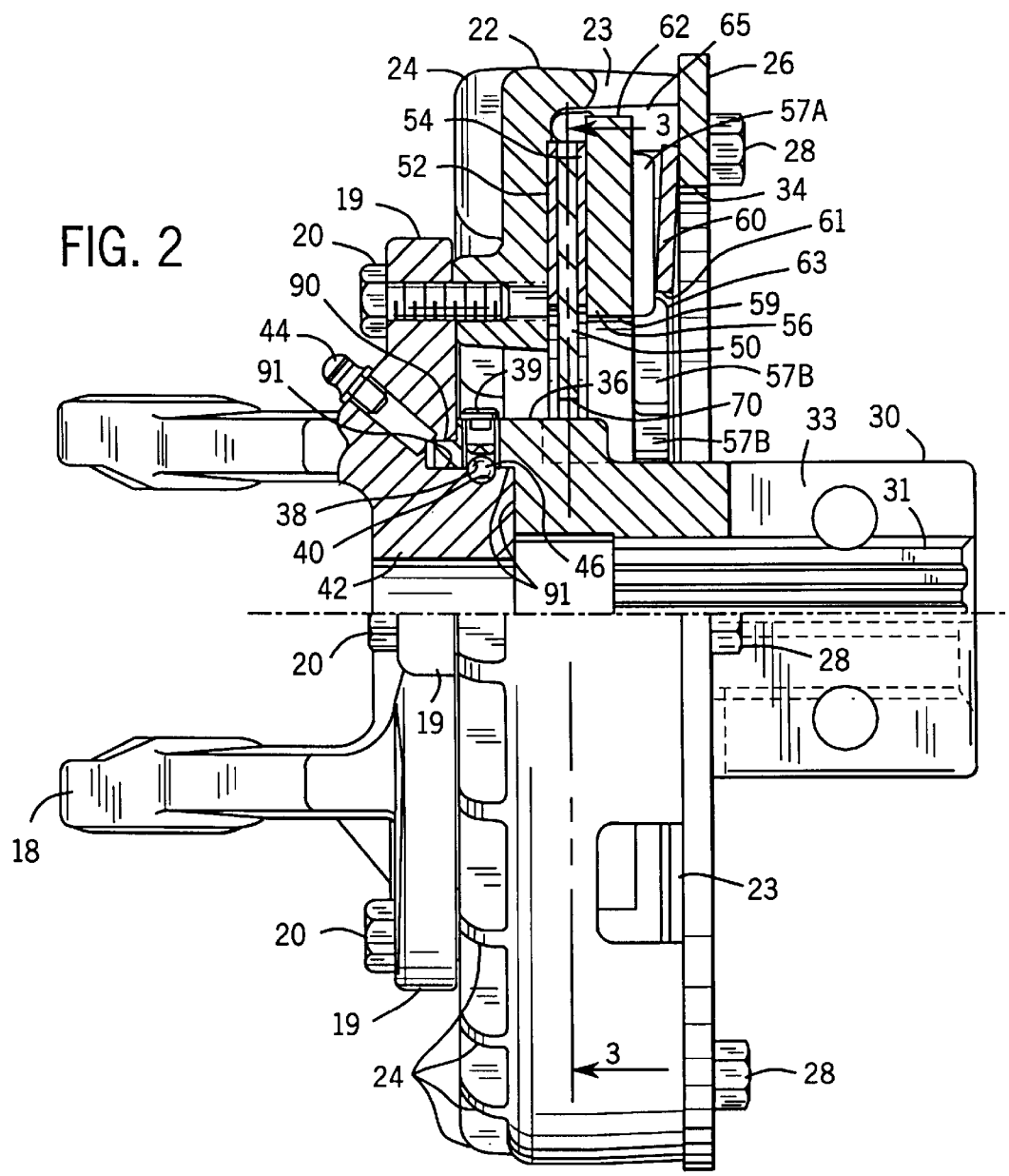
FIG. 2 is a partial sectional view of the device shown in FIG. 1, as viewed from the plane of the line 2—2 of FIG. 4.

Hub 30 is preferably internally splined as shown at 31 to mate with the splines on a shaft to be connected to the hub 30 and may be slotted as shown at 33 and provided with bolts 32 for clamping it to the shaft to fix it axially, for example for clamping it to the implement gearbox or input shaft or power take-off shaft of a tractor. A keyed connection or any other suitable rotary drive connection may alternatively be used. Hub 30 extends through hole 34 (FIG. 2) of plate 26 and, at the inner end of hub 30, an axially extending flange 36 is formed and defines an outer ball bearing race 38 on its inner diameter. A set screw 39 is screwed radially into flange 36 and opens into the race 38 so that balls 46 can be loaded into the race. It should be noted that the gap at 90 (for example, 0.0025 inches) is preferably substantially smaller than the gaps at 91 (for example, 0.012 inches) to inhibit lubricant flow past it. The axial length of the gap 90 (for example, 0.25 inches) and its smallness work as an effective seal, so that no additional seal, such as an O-ring, is necessary.

An inner bearing race 40 is formed in flange 42 of yoke 18, and grease fitting 44 in yoke 18 allows for lubrication of the balls 46 in the raceways 38 and 40. Accordingly, the anti-friction bearing provided by the balls 46 in the raceways 38 and 40 allows for relative rotation between the yoke 18 and the hub 30, while fixing the yoke 18 and the hub 30 together axially.

Radially outward of flange 36, a clutch plate 50 is received in a slight recess on the inside axial face of the housing 22, which locates the plate 50 radially. The clutch plate 50 surrounds hub 30 and is in intimate face to face contact with facings 52 and 54 of friction material on its two axial faces, as further described below with reference to FIGS. 5 and 6, between housing 22 and pressure plate 56. Pressure plate 56 is biased toward clutch plate 50 by belleville spring 60 so as to compress the plate 50 and facings 52 and 54 between the pressure plate 56 and the housing 22. Coil springs or other biasing means may also be used to bias the plate 56.

Pressure plate 56 preferably has raised axially extending angularly spaced ribs 57A and 57B (FIGS. 2 and 4) on its outer surface which press against the spring 60 adjacent to the inside diameter of the spring 60 so as to minimize the surface area of contact between the pressure plate 56 and the spring 60, thereby minimizing heat transfer from the plate 56 to the spring 60. This minimizes damage to the spring 60 from heat. Ribs 57A stop at the inside diameter 59 of the plate 56 and ribs 57B rise axially slightly at the inside diameter 59 to create shoulders 63 which locate the spring 60 on its inside diameter 61. Ribs 57B extend inward of the inside diameter 59 to create a centrifugal fan for cooling of the unit. Also, open spaces 21 (two of four shown in FIG. 4) are defined between the legs 19 and the housing 22 through which air may be drawn by the fan to cool the unit. Openings 23 are also preferably provided in the side of the clutch housing 22 for cooling air flow.

On its outer perimeter, pressure plate 56 has ears 62 (FIG. 4) which extend into spaces 65 defined between tongues 64 formed on the inside of the housing 22 so as to hold the housing 22 and pressure plate 56 nonrotatable relative to one another, but allow them to move axially relative to one another. The fit of the ears 62 in the spaces 65 need not be tight, so as to allow for liberal manufacturing tolerances, since once the ears 62 contact the tongues 64, they stay in that position, being substantially held against relative rotation by the frictional engagement of the clutch plate 50.

Figure 3:
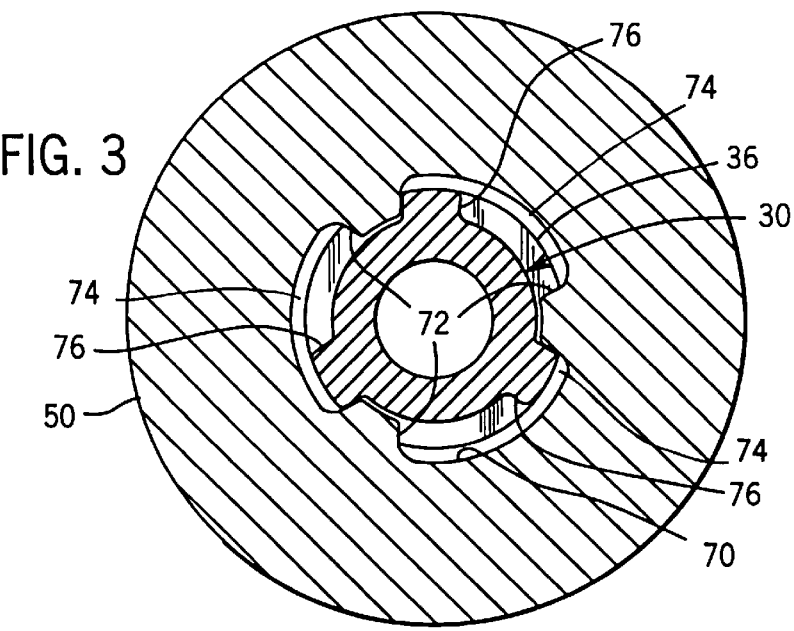
FIG. 3 is a cross-sectional view of a clutch plate and hub for the invention as viewed from the plane of the line 3—3 of FIG. 2 and shown in an engaged position.
Figure 4:
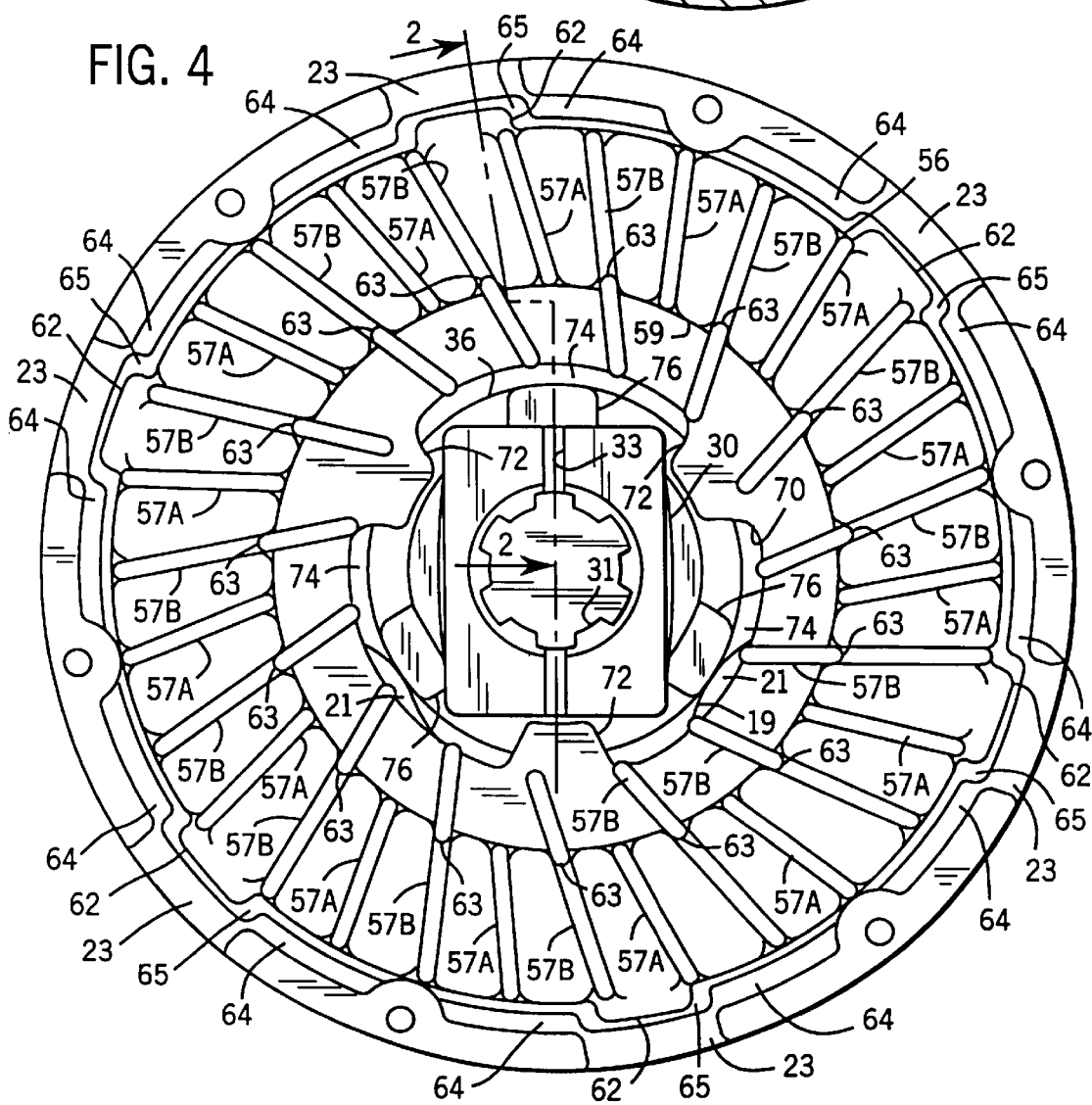
FIG. 4 is a right end elevational view of the coupling shown without the cover plate and belleville spring and with the hub and clutch plate shown in a disengaged position.

The inside periphery 70 of the clutch plate 50 defines three equiangularly spaced tangs 72 (FIG. 3) with angular spaces 74 defined between the tangs 72. Three equiangularly spaced lugs 76 are formed on the flange 36 of hub 30 which extend into the spaces 74 and are of an angular size smaller than the spaces 74 so that the hub 30 may be turned by approximately 60 degrees relative to yoke 18 (30° in either direction from being centered, as shown in FIG. 4) before the lugs 76 contact the tangs 72. This degree of angular freedom is sufficient in most cases to allow aligning the splines of the hub 30 with the splines of the shaft to which the hub 30 is to be connected, or, if the opposite end of the drive-line is the last one to be connected, the alignment can be made at that end as well. More or less than three tangs and nestled lugs may be used to practice the invention.

Under operation, when the device 10 is being used to transmit torque in the operation of the driveline, the torque is transmitted by the lugs 76 abutting the tangs 72 and is transmitted up to the torque value at which slippage occurs between the clutch plate 50 and the housing 22 and pressure plate 56.

Figure 5:
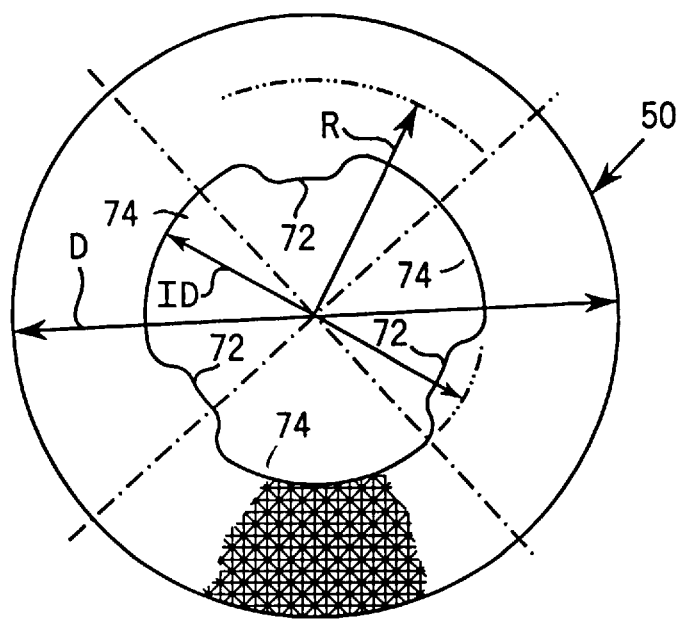
FIG. 5 is a side plan view of a clutch plate 50 for the clutch of FIGS. 1–4.
Figure 6:
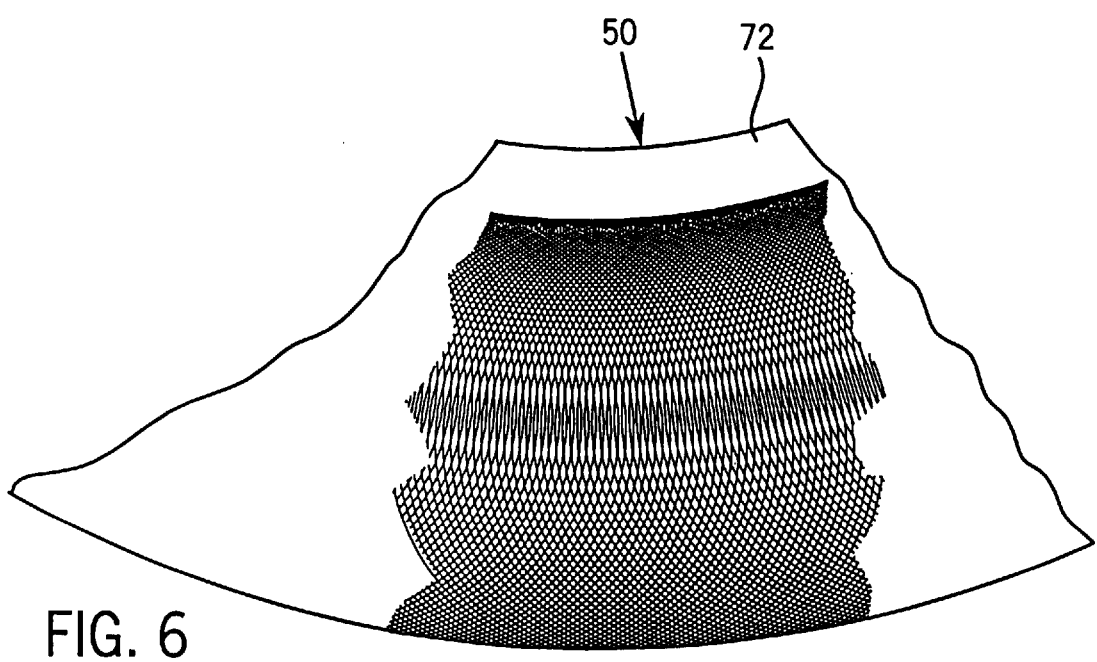
FIG. 6 is an enlarged fragmentary view showing an alternate knurling pattern for the clutch plate 50.

FIGS. 5 and 6 illustrate possible alternative knurling patterns for the opposed axial faces of the clutch plate 50. Although the knurling pattern is illustrated fragmentary, it should be understood that the knurling pattern would cover substantially the entire surface area of each axial face of the plate 50, but need not cover the tangs 72.

In FIG. 5, a clutch plate 50 having a raised diamond knurl on both sides thereof is illustrated. In one form, the raised diamond knurl was made with a pitch of 0.060 inches, meaning that the peaks of the knurl were a minimum of 0.060 inches apart (i.e., 0.060 inches apart in both orthogonal directions) and 0.060 inches tall. However, any knurl pattern or knurl specification could be used which results in the knurl pattern impressing into the surface of the friction discs 52 and 54 under the influence of the spring 60. It may also be desirable to place the two friction discs 52 and 54 with the clutch plate 50 between them into a press, prior to assembling them into the clutch 10, so as to press the initial impression of the knurl in the faces of the discs 52 and 54, with a greater force than would be imparted by the spring 60.

Preferably, the knurl pattern is impressed into the disc 52, 54 material all the way down to the root or valley of the knurl, so that the root or valley of the knurl is completely filled by the material of the discs 52, 54. This is possible with a spring force of 5,000 lbs. using a clutch plate 50 which is 6.2 inches in diameter D (FIG. 5), with an inside diameter ID of 3.45 inches, using standard friction material, for example, the material sold by Scan-Pac of Menomonee Falls, Wis., which is identified by "IRF-38". The impression of the knurl into the discs 52 and 54 has been found to hold the discs 52 and 54 so securely that it is not necessary to bond or otherwise secure them to the clutch plate 50.

FIG. 6 illustrates an alternate, preferred, knurl pattern for both sides of the clutch plate 50. In this knurl pattern, the valleys are actually one continuous valley which is defined by a helicoid (i.e., a flattened helix). In the form illustrated, at a nominal median radius R (R=(D+ID)/2) equal to 2.55 inches, 50 circles (or coils of the helicoid) of approximately 1.20 inches diameter each are formed per inch. Thus, the centers of the coils are nominally 0.020 inches apart. The radius at the bottom of the continuous valley is approximately 0.004–0.016 inches (0.016 preferred) and the valley is 0.02–0.04 inches deep. This pattern is formed on both sides of the clutch plate 50. Other specifications of a helicoid pattern may also be suitable.

The helicoid path traced by the valley of the knurl pattern in FIG. 6 should create a sufficiently high density and sharpness of peaks (which vary in shape as a result of the path of the valley and many of which do not come to a point, since the helicoid path of the valley is formed in a flat side) so that the peaks, even though many are not pointed, penetrate the friction material of the discs 52 and 54 as far as possible. Preferably, the peaks of the knurl penetrate the discs 52 and 54 all the way to the bottom or root of the valley for the whole length of the valley, so as to completely fill the valley with the friction material of the adjacent disc 52 or 54.

Methods for making knurl patterns are well known. For example, a knurl pattern can be made on a milling machine or with a press. For example, to make the helicoid knurl of FIG. 6, the clutch plate is rotated under a fixed axis cutter which is rotated with its axis of rotation perpendicular to the median circumferential axis of the clutch plate 50 (which is at radius R). Thereby, the continuous helicoidal valley which defines the knurl is cut in the surface of the clutch plate 50. Any suitable method of forming the knurl, however, may be used to practice the present invention.

Many modifications and variations to the preferred embodiments described will be apparent to those skilled in the art. Therefore, the invention should not be limited to the embodiments described, but should be defined by the claims which follow:

We claim:

1. In a dry friction torque overload clutch which has a clutch plate with an axially facing side force biased in continuous face to face contact with an axially facing side of a friction disc of relatively soft friction material, the improvement wherein said axial face of said clutch plate defines a knurl pattern of a series of peaks separated from one another by one or more valleys in said clutch plates and said peaks are impressed into said axially facing side of said friction disc so as to hold said friction disc rotatably and radially fixed to said axial face of said clutch plate without slippage between said clutch plate and friction disc.

2. The improvement of claim 1, wherein said knurl pattern is in a raised diamond pattern.

3. The improvement of claim 1, wherein said knurl pattern is in a helicoidal pattern.

4. The improvement of claim 1, wherein said knurl pattern is impressed into said axially facing side of said friction disc so that said one or more valleys of said knurl pattern are filled with material of said friction disc.

5. The improvement of claim 1, wherein an opposite axially facing side of said clutch plate also defines a knurl pattern of peaks separated from one another by one or more valleys, said opposite axially facing side being in face to face contact with an axially facing side of a second friction disc of relatively soft friction material, and said peaks on said opposite axially facing side are impressed into said axially facing side of said second friction disc.

6. The improvement of claim 5, wherein said force biasing is accomplished by a spring which exerts an axial force that continuously compresses said friction discs against said axially facing sides of said clutch plate.

7. The improvement of claim 6; wherein axially facing sides of said friction discs which are opposite from said clutch plate are flat and in surface to surface contact with axially facing flat surfaces of a housing on one side and a pressure plate on an opposite side, said housing and pressure plate being rotatably fixed to one another and capable of rotating relative to said clutch plate and friction discs when a torque overload occurs.

8. The improvement of claim 7, wherein said clutch plate has an inner periphery which is in rotary engagement with a hub of said clutch, with a limited range of free rotary motion possible between said clutch plate and hub, and said housing is in rotary engagement with a universal joint yoke.

* * * * *